United States Patent
Dao et al.

(10) Patent No.: US 11,050,495 B2
(45) Date of Patent: Jun. 29, 2021

(54) ELECTRONIC DEVICE INCLUDING TRANSCEIVER FOR CALIBRATING I/Q IMBALANCE IN MILLIMETER WAVE COMMUNICATION SYSTEM AND METHOD OF OPERATING SAME

(71) Applicant: Samsung Electronics Co., Ltd., Suwon-si (KR)

(72) Inventors: Tuan Manh Dao, Suwon-si (KR); Yuichi Aoki, Suwon-si (KR); Yonghoon Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/933,190

(22) Filed: Jul. 20, 2020

(65) Prior Publication Data

US 2021/0021353 A1  Jan. 21, 2021

Related U.S. Application Data

(60) Provisional application No. 62/875,616, filed on Jul. 18, 2019.

(51) Int. Cl.
*H04B 17/14* (2015.01)
*H04B 17/21* (2015.01)

(52) U.S. Cl.
CPC ............ *H04B 17/14* (2015.01); *H04B 17/21* (2015.01)

(58) Field of Classification Search
CPC ................................. H04B 17/14; H04B 17/21
See application file for complete search history.

(56) References Cited

U.S. PATENT DOCUMENTS 8,295,845 B1    10/2012 Abdollahi-Alibeik et al.
10,484,108 B1 * 11/2019 Al-Qaq ............... H04B 17/12
(Continued)

FOREIGN PATENT DOCUMENTS

KR    10-2017-0052450 A    5/2017

OTHER PUBLICATIONS

FCC News Release, "FCC Proposes Steps Towards Auction of 37 GHZ, 39 GHZ, and 47 GHZ Bands," [Online] https://www.fcc.gov/document/fcc-proposes-steps-towards-auction-37-ghz-39-ghz-and-47-ghz-bands, Aug. 2018.
(Continued)

*Primary Examiner* — Jaison Joseph
(74) *Attorney, Agent, or Firm* — Jefferson IP Law, LLP

(57) ABSTRACT

The disclosure relates to a communication method and system for converging a 5th-Generation (5G) communication system for supporting higher data rates beyond a 4th-Generation (4G) system with a technology for Internet of Things (IoT). A method of operating an electronic device in a wireless communication system is provided. The method includes inputting training signals into a first loopback route and a second loopback route, determining a loopback gain and a loopback phase, based on a first training signal passing through the first loopback route and a second training signal passing through the second loopback route, determining a frequency domain compensation filter, based on the loopback gain and the loopback phase, determining an FIR filter and a DC offset, based on the frequency domain compensation filter, and compensating for a transmission signal and a reception signal, based on the FIR filter and the DC offset.

20 Claims, 23 Drawing Sheets

(56) References Cited

U.S. PATENT DOCUMENTS

| | | | |
|---|---|---|---|
| 2011/0158297 A1 | 6/2011 | Ding et al. | |
| 2011/0228826 A1 | 9/2011 | Yokoo et al. | |
| 2011/0260898 A1* | 10/2011 | Velazquez | H03F 1/3247 341/110 |
| 2012/0177084 A1 | 7/2012 | Cupo | |
| 2013/0016798 A1* | 1/2013 | Velazquez | H04B 1/001 375/340 |
| 2013/0121388 A1 | 5/2013 | Tseng et al. | |
| 2014/0120851 A1* | 5/2014 | Steele | H04B 1/1036 455/90.2 |
| 2015/0195050 A1* | 7/2015 | Kim | H04B 17/14 375/221 |
| 2016/0359614 A1 | 12/2016 | Hao et al. | |
| 2017/0126465 A1 | 5/2017 | Kim et al. | |
| 2020/0132810 A1* | 4/2020 | Subburaj | G01S 7/4008 |

OTHER PUBLICATIONS

M. Valkama, M. Renfors, and V. Koivunen, "Compensation of frequency-selective I/Q imbalances in wideband receivers: Models and algorithms," in Proc. IEEE 3rd Workshop Signal Process. Adv. Wireless Commun. (SPAWC), Taoyuan, Taiwan, Mar. 2001, pp. 42-45, doi:10.1109/SPAWC.2001.923837.

L. Anttila, M. Valkama, and M. Renfors, "Circularity-based I/Q imbalance compensation in wideband direct-conversion receivers," IEEE Trans. Veh. Technol., vol. 57, No. 4, pp. 2099-2113, Jul. 2008.

K.-P. Pun, J. Franca, and C. Azeredo-Leme, "Wideband digital correction of I and Q mismatch in quadrature radio receivers," Circuits and Systems, 2000. Proceedings. ISCAS 2000 Geneva., vol. 5, pp. 661-664 vol. 5, May 2000.

Shusuke Kawai, etc, "A 1024-QAM Capable WLAN Receiver with -56.3 dB Image Rejection Ratio using Self-Calibration Technique", in 2017 IEEE International Symposium on Circuits and Systems (ISCAS), May 2017.

L. Anttila, M. Valkama, and M. Renfors, "Frequency-selective I/q mismatch calibration of wideband direct-conversion transmitters," IEEE Trans. Circuits Syst. II, Express Briefs, vol. 55, No. 4, pp. 359-363, Apr. 2008.

A. Rezola, J. F. Sevillano, I. Gurutzeaga, D. del Rio, R. Berenguer and I. Vélez, "Built-in-Self-Calibration for I/Q Imbalance in Wideband Millimeter-Wave Gigabit Transmitters," IEEE Transactions on Microwave Theory and Techniques, vol. 65, No. 11, pp. 4758-4769, Nov. 2017.

J. Park, Y. Lee, and H. Park, "Preamble design for joint estimation of CFO and I/Q imbalance for direct conversion OFDM system," IET Commun., vol. 3, No. 4, pp. 597-602, Apr. 2009.

J. Feigin and D. Brady, "Joint transmitter/receiver I/Q imbalance compensation for direct conversion OFDM in packet-switched multipath environments," IEEE Trans. Signal Process., vol. 57, No. 11, pp. 4588-4593, Nov. 2009.

S. Narayanan, B. Narasimhan, and N. Al-Dhahir, "Baseband estimation and compensation of joint TX/RX I/Q imbalance in SC-FDE transceivers," in Proc. 43rd Annu. Conf. Inf. Sci. Syst. (CISS), Baltimore, MD, USA, Mar. 2009, pp. 551-556.

Y. Chen, J. Zhang, and A. D. S. Jayalath, "Low-complexity estimation of CFO and frequency independent I/Q mismatch for OFDM systems," EURASIP J. Wireless Commun. Netw., vol. 2009, Apr. 2009, Art. No. 542187.

Y.-H. Chung and S.-M. Phoong, "Joint estimation of I/Q imbalance, CFO and channel response for MIMO OFDM systems," IEEE Trans. Commun., vol. 58, No. 5, pp. 1485-1492, May 2010.

J. W. Jeong, A. Nassery, J. N. Kitchen, and S. Ozev, "Built-in self-test and digital calibration of zero-IF RF transceivers," IEEE Trans. Very Large Scale Integr. (VLSI) Syst., vol. 24, No. 6, pp. 2286-2298, Jun. 2016.

W.-H. Yu et al., "A nonrecursive digital calibration technique for joint elimination of transmitter and receiver I/Q imbalances with minimized add-on hardware," IEEE Trans. Circuits Syst. II, Express Briefs, vol. 0, No. 8, pp. 462-466, Aug. 2013.

J. Luo, A. Kortke, and W. Keusgen, "Efficient self-calibration of frequency-dependent I/Q-imbalance in direct-conversion OFDM transceivers," in Proc. IEEE Int. Symp. Circuits Syst. (ISCAS), Taipei, Taiwan, May 2009, pp. 413-416.

Chen-Jui Hsu, Wern-Ho Sheen, "Joint Calibration of Transmitter and Receiver Impairments in Direct-Conversion Radio Architecture", Wireless Communications IEEE Transactions on, vol. 11, No. 2, pp. 832-841, 2012.

X. Huang, Y. J. Guo and J. A. Zhang, "Transceiver I/Q Imbalance Self-Calibration With Phase-Shifted Local Loopback for Multichannel Microwave Backhaul," IEEE Transactions on Wireless Communications, vol. 15, No. 11, pp. 7657-7669, Nov. 2016.

Y. Aoki, D.M Tuan, K.H Min, Y. Hwang, Y.H Kim, S.Y Yang "1.4-GHz Bandwidth Frequency-Dependent I/Q Imbalance Calibration for 5G mmWave Communications," IMS 2019, Jun. 2019.

T. Obara, Y. Inoue, Y. Aoki, S. Suyama, J. Lee and Y. Okumura, "Experiment of 28 GHz Band 5G super wideband transmission using beamforming and beam tracking in high mobility environment," IEEE International Symposium on Personal, Indoor, and Mobile Radio Communications (PIMRC), Sep. 2016.

S. Kawai et al., "An 802.11ax 4×4 High-Efficiency WLAN AP Transceiver SoC Supporting 1024-QAM with Frequency-Dependent IQ Calibration and Integrated Interference Analyzer," IEEE Journal of Solid-State Circuits, vol. 53, No. 12, pp. 3688-3699, Dec. 2018.

Linda Zhu, "Adaptive I/Q Mismatch Compensation for Wideband Receiver", A thesis submitted in partial fulfillment of the Requirement for the degree, Dec. 2014.

International Search Report dated Oct. 27, 2020, Issued in PCT/KR2020/009545.

* cited by examiner $\theta_1 = 45°$, $\theta_2 = 225°$ $\theta_1 = 115°$, $\theta_2 = 315°$

ELECTRONIC DEVICE INCLUDING TRANSCEIVER FOR CALIBRATING I/Q IMBALANCE IN MILLIMETER WAVE COMMUNICATION SYSTEM AND METHOD OF OPERATING SAME

CROSS-REFERENCE TO RELATED APPLICATION(S)

This application is based on and claims priority under 35 U.S.C. § 119(e) of a U.S. Provisional application Ser. No. 62/875,616, filed on Jul. 18, 2019, in the U.S. Patent and Trademark Office, the disclosure of which is incorporated by reference herein in its entirety.

BACKGROUND

1. Field

The disclosure relates to a wireless communication system. More specifically, the disclosure relates to an electronic device including an ultra-wideband transceiver for calibrating I/Q imbalance in a 5th-Generation (5 G) communication system using millimeter waves (mmWave) and a method of operating the same.

2. Description of Related Art

To meet the demand for wireless data traffic having increased since deployment of 4th-Generation (4 G) communication systems, efforts have been made to develop an improved 5th-Generation (5 G) or pre-5 G communication system. Therefore, the 5 G or pre-5 G communication system is also called a 'Beyond 4 G Network' or a 'Post Long Term Evolution (LTE) System'. The 5 G communication system is considered to be implemented in higher frequency (mmWave) bands, e.g., 60 gigahertz (GHz) bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5 G communication systems. In addition, in 5 G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5 G system, Hybrid Frequency Shift Keying (FSK) and Quadrature Amplitude Modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5 G communication systems to IoT networks. For example, technologies, such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5 G technology and the IoT technology.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, as aspect of the disclosure is to provide a transceiver having a loopback hardware structure for calibrating transceiver I/Q imbalance in a wireless communication system.

Another aspect of the disclosure is to provide a method of calibrating transceiver I/Q imbalance through a transceiver having a loopback hardware structure in a wireless communication system.

Additional aspects will be set forth in part in the description which follows and, in part, will be apparent from the description, or may be learned by practice of the presented embodiments.

In accordance with an aspect of the disclosure, a method of operating an electronic device in a wireless communication system is provided. The method includes inputting training signals into a first loopback route and a second loopback route, determining a loopback gain and a loopback phase, based on a first training signal passing through the first loopback route and a second training signal passing through the second loopback route, determining a frequency domain compensation filter, based on the loopback gain and the loopback phase, determining a finite impulse response (FIR) filter and a direct current (DC) offset, based on the frequency domain compensation filter, and compensating for a transmission signal and a reception signal, based on the FIR filter and the DC offset. The training signals are determined based on a phase of a first training signal and a phase of a second training signal.

In accordance with another aspect of the disclosure, an electronic device is provided. The electronic device includes a controller, and a radio frequency (RF) transceiver. The RF transceiver includes a transmitting side, a receiving side, and a first loopback route and a second loopback route electrically connected to the transmitting side and the receiving side. The controller inputs training signals into the first loopback route and the second loopback route, determines a loopback gain and a loopback phase, based on a first training signal passing through the first loopback route and a second training signal passing through the second loopback route, determines a frequency domain compensation filter, based on the loopback gain and the loopback phase, determines an FIR filter and a DC offset, based on the frequency domain compensation filter, and compensates for a transmission signal and a reception signal, based on the FIR filter and the DC offset. The training signals are determined based on a phase of a first training signal and a phase of a second training signal.

The loopback phase may include a phase of the first loopback route and a phase of the second loopback route. The training signals may be determined based on a difference between the phase of the first loopback route and the phase of the second loopback route.

The difference between the phase of the first loopback route and the phase of the second loopback route may be 90 degrees.

The training signals may be determined based on a difference between a phase of the first training signal and a phase of the second training signal.

The difference between the phase of the first training signal and the phase of the second training signal may be 180 degrees.

The training signals may be determined based on a determination function. The determination function may be determined based on the difference between the phase of the first loopback route and the phase of the second loopback route and the difference between the phase of the first training signal and the second training signal.

A value of the determination function may not be 0.

The training signals may be determined based on a maximum value of the determination function.

An image component of the transmission signal may be removed based on the FIR filter and the DC offset.

An image component of the reception signal may be removed based on the FIR filter and the DC offset.

According to the disclosure, there is an effect of achieving an average image rejection ratio (IRR) of 48 decibel (dB) through a transceiver having a loopback hardware structure.

According to the disclosure, there is another effect of suppressing image signals dependent on a frequency among noise ratio (NR) signals in a bandwidth of 100 megahertz (MHz) to a noise level over all a bandwidth of 1400 MHz through a transceiver having a loopback hardware structure.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
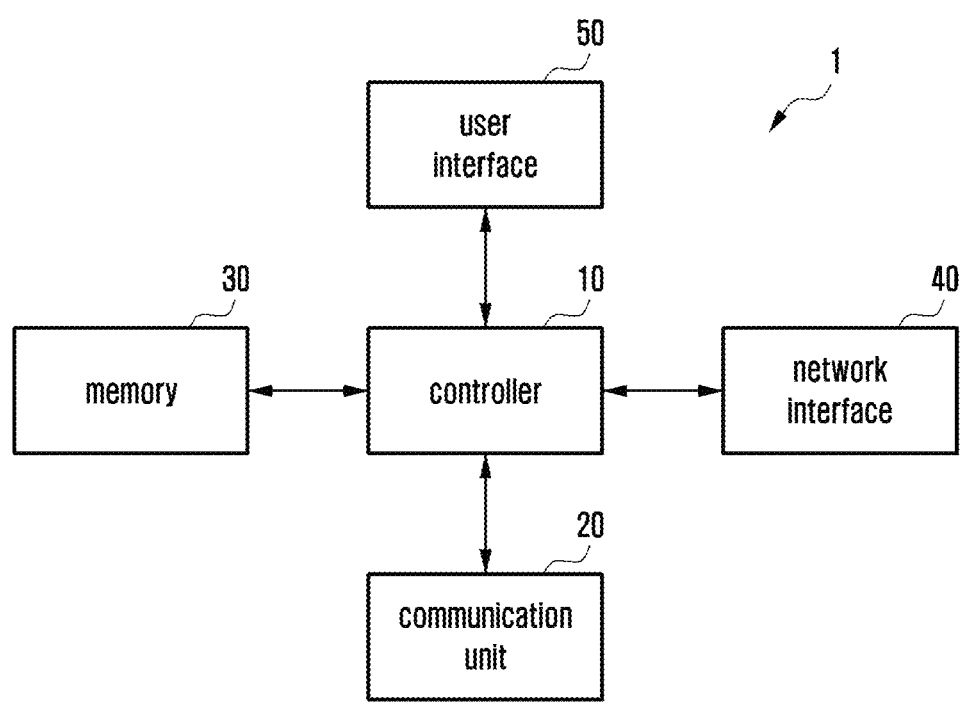
FIG. 1 is a block diagram illustrating an electronic device in a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more central processing units (CPUs) within a device or a security multimedia card. Further, the "unit" in the embodiments may include one or more processors.

FIG. 1 is a block diagram illustrating an electronic device in a wireless communication system according to an embodiment of the disclosure.

Referring to FIG. 1, an electronic device 1 may include a controller 10, a communication unit 20, a memory 30, a network interface 40, and a user interface 50. The electronic device 1 may additionally have more elements according to an implementation scheme. In the disclosure, there is no limitation on additional elements.

The controller 10 may control the basic operation of the electronic device 1 and may control reception and storage of various signals to be described below. For example, the controller 10 may be implemented as at least one processor or/and program for performing the operation of the electronic device 1.

The communication unit 20 may be connected to another electronic device through a radio channel and may transmit and receive signals and/or message to and from various network function devices. When the electronic device 1 communicates with a 5 G network, the communication unit 20 may be a device capable of performing transmission/reception to/from the 5 G communication network. Further, the communication unit 20 may include a communication processor as necessary. When the communication unit 20 does not include a communication processor, all signals and/or message may be processed by the controller 10.

The memory 30 may store various pieces of data required for controlling the electronic device 1 and may have an area for storing signals to be described below. For example, the memory 30 may store programs and various pieces of control information required by the controller 10 and further store other pieces of information described in the disclosure.

The network interface 40 may communicate with another electronic device in a core network.

The user interface 50 may provide various interfaces for a user of the electronic device 1.

In order to use new applications, a 5 G communication network providing a data rate of Gbps may be used. Millimeter wave bands of 28 GHz and 39 GHz in which broadband communication is possible may be used to meet demands for an ultra-high data rate.

I/Q modulation may be generally used by an analog-digital converter (ADC) and a digital-analog converter (DAC) as an actual implementation to avoid demands for a high sampling speed. However, I/Q imbalance may be generated in the up/down mixer, the low-pass filter (LPF), and the DAC/ADC. The I/Q imbalance may be frequently generated in the implementation of actual I/Q modulation. Imbalance may be generated when there is a difference between components of I and Q branches. The I/Q imbalance may be independent from or dependent on the frequency. For example, imbalance of a gain and a phase occurring in the mixer may be independent from the frequency since a frequency of a local oscillator (LO) is generally fixed. When gains of pair mixers are not the same, gain imbalance may occur. Phase imbalance may occur when a phase difference between local oscillators (LOs) for I and Q branches is not accurately 90 degrees. In a narrow band system, it may be assumed that a difference in I and Q branches is constant in a bandwidth. Further, it may be assumed that frequency-dependent imbalance is ignored and only frequency-independent imbalance is considered. Unlike this, in a wideband system, frequency-dependent I/Q imbalance may be important since transfer characteristics of LPFs are different. For example, transfer characteristics of LPFs for cut-off frequencies may be different. As a result, in an ultra-wideband system, I/Q imbalance may become more severe. The I/Q imbalance may cause mirror-frequency interference or an unwanted signal in the reversed side of the center bandwidth frequency. The I/Q imbalance may ultimately result in a severe degradation in system performance, that is, error vector magnitude (EVM). As a result, the I/Q imbalance may limit the use of high-order modulation. For example, a 5 G communication system may support 256-quadrature amplitude modulation (QAM) that requires a signal to noise ratio (SNR) higher than or equal to 30 dB. It may be preferable that an image rejection ratio (IRR) is ideally higher than or equal to 40 dB. Due to non-ideal characteristics of components, an actual circuit designed in an I/Q transceiver may generally provide an IRR lower than 30 dB. Accordingly, the I/Q imbalance should be calibrated.

There may be a plurality of I/Q calibration techniques. However, most calibration techniques deal with an imbalance problem of a receiver or a transmitter. This may not be practical for being applied to the 5 G communication system. There are techniques for calibrating I/Q imbalance for a joint transmitter and receiver. However, the techniques may calibrate only frequency-independent I/Q imbalance, and a reference LO exactly having a phase shift of 90 degrees is required. A method of jointly calibrating frequency-dependent transmitter and receiver I/Q imbalance needs information for frequency-independent phase imbalance that should be separately estimated in advance.

The method of calibrating I/Q imbalance according to an embodiment may include a method of separating frequencies of the transmitter and the receiver for joint calibration. However, the method of separating frequencies may have difficulty in hardware implementation.

The method of calibrating I/Q imbalance according to an embodiment may include a method using a local loopback for estimating I/Q imbalance through one direct loopback and one phase shifter loopback. In order to apply the method, information on phase shifter characteristics should be acquired. However, it requires the knowledge of frequency-independent phase imbalances which need to be estimated separately in advance.

The method of calibrating I/Q imbalance according to an embodiment may include a method for the frequency domain to jointly estimate and compensate for frequency-independent transmitter and receiver I/Q imbalance in a 5 G millimeter wave system. The method may calibrate I/Q imbalance on the basis of the specific loopback hardware structure and specifically designed training signals. Further, the method may evaluate I/Q calibration performance through simulation and measurement.

Calibration of I/Q imbalance may be necessary for protecting the performance of the 5 G millimeter wave communication system. The disclosure provides a new apparatus and a new method for calibrating joint frequency-dependent I/Q imbalance for an ultra-wideband transceiver through the loopback hardware structure.

First, frequency-dependent I/Q imbalance of the transmitter and the receiver may be formulated as a function for an input of a loopback response to a training signal and an output of a reception signal. Further, a compensation filter may be analytically generalized as a solution of four linear equations. The loopback hardware structure and training signals may be specifically designed to have a specific phase relation for solving compensation filters. For example, the loopback hardware structure and the training signals may be implemented by complex finite impulse response (FIR) filters.

The calibration method according to the disclosure may provide an average IRR of 48 dB. Ultimately, a frequency-dependent image of an NR signal in a 100 MHz bandwidth is suppressed to a noise level over all a 1400 MHz bandwidth.

Figure 2:
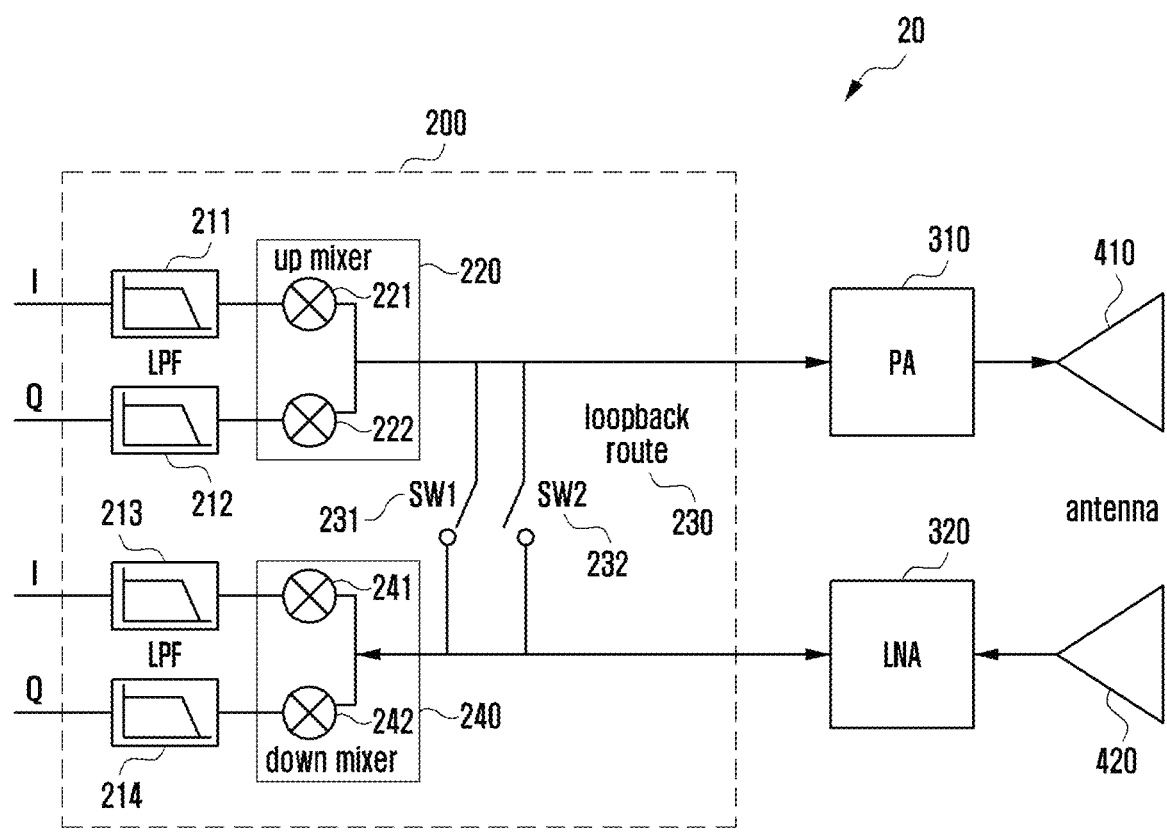
FIG. 2 is a conceptual diagram illustrating a communication unit in a wireless communication system according to an embodiment of the disclosure.

FIG. 2 is a conceptual diagram illustrating a communication unit in a wireless communication system according to an embodiment of the disclosure.

Referring to FIG. 2, the communication unit 20 may include a radio frequency (RF) transceiver 200, a power amplifier (PA) 310, a low-noise amplifier (LNA) 320, and a plurality of antennas 410 and 420. The communication unit 20 may be the same as or similar to the communication unit 20 of FIG. 1.

The RF transceiver 200 may include a plurality of low-pass filters 211 to 214, an up mixer 220, a loopback route 230, and a down mixer 240. The up mixer 220 may include a first up mixer 221 and a second up mixer 222. The down mixer 240 may include a first down mixer 241 and a second down mixer 242.

The first low-pass filter 211 may receive an output signal according to the control of the controller 10. For example, the first low-pass filter 211 may receive a signal through one end of the first low-pass filter 211. The first low-pass filter 211 may output an I signal by filtering the received signal.

The other end of the first low-pass filter 211 may be electrically connected to one end of the first up mixer 221. The first low-pass filter 211 may transfer the I signal to the first up mixer 221.

The second low-pass filter 212 may receive an output signal according to the control of the controller 10. For example, the second low-pass filter 212 may receive a signal through one end of the second low-pass filter 212. The second low-pass filter 212 may output a Q signal by filtering the received signal. The other end of the second low-pass filter 212 may be electrically connected to one end of the second up mixer 222. The second low-pass filter 212 may transfer the Q signal to the second up mixer 222.

The up mixer 220 may be electrically connected to the power amplifier 310. For example, the other end of the first up mixer 221 may be electrically connected to one end of the power amplifier 310. The first up mixer 221 may up convert a frequency of the filtered I signal. The other end of the second up mixer 222 may be electrically connected to one end of the power amplifier 310. The second up mixer 222 may up convert a frequency of the filtered Q signal. The up mixer 220 may transfer the up-converted I/Q signal to the power amplifier 310.

The power amplifier 310 may amplify the I/Q signal received from the up mixer 220. The power amplifier 310 may be electrically connected to a first antenna 410. The power amplifier 310 may transfer the amplified I/Q signal to the first antenna 410. The first antenna 410 may radiate the amplified I/Q signal to the air.

A second antenna 420 may receive a radio signal transmitted through the air. The second antenna 420 may be electrically connected to the low-noise amplifier 320. The second antenna 420 may transfer the received signal to the low-noise amplifier 320.

The low-noise amplifier 320 may amplify the received signal. The low-noise amplifier 320 may be electrically connected to the down mixer 240.

The down mixer 240 may be electrically connected to the low-noise amplifier 320. Further, the down mixer 240 may be electrically connected to the up mixer 220 through the loopback route 230. The loopback route 230 may include a first switch (SW1) 231 and a second switch (SW2) 232. For example, the down mixer 240 may be electrically connected to the up mixer 220 through at least one of the first switch (SW1) 231 and the second switch (SW2) 232.

The down mixer 240 may down convert a frequency of the signal transmitted from the low-noise amplifier 320 or the up mixer 220. For example, the first down mixer 241 may down convert the frequency of the transmitted signal. The first down mixer 241 may transfer the down-converted signal to the third low-pass filter 213. The second down mixer 242 may down convert a frequency of the transmitted signal. The second down mixer 242 may transfer the down-converted signal to the fourth low-pass filter 214.

The third low-pass filter 213 may receive the down-converted signal from the first down mixer 241. The third low-pass filter 213 may output an I signal by filtering the down-converted signal. The fourth low-pass filter 214 may receive the down-converted signal from the second down mixer 242. The fourth low-pass filter 214 may output a Q signal by filtering the down-converted signal.

Figure 3:
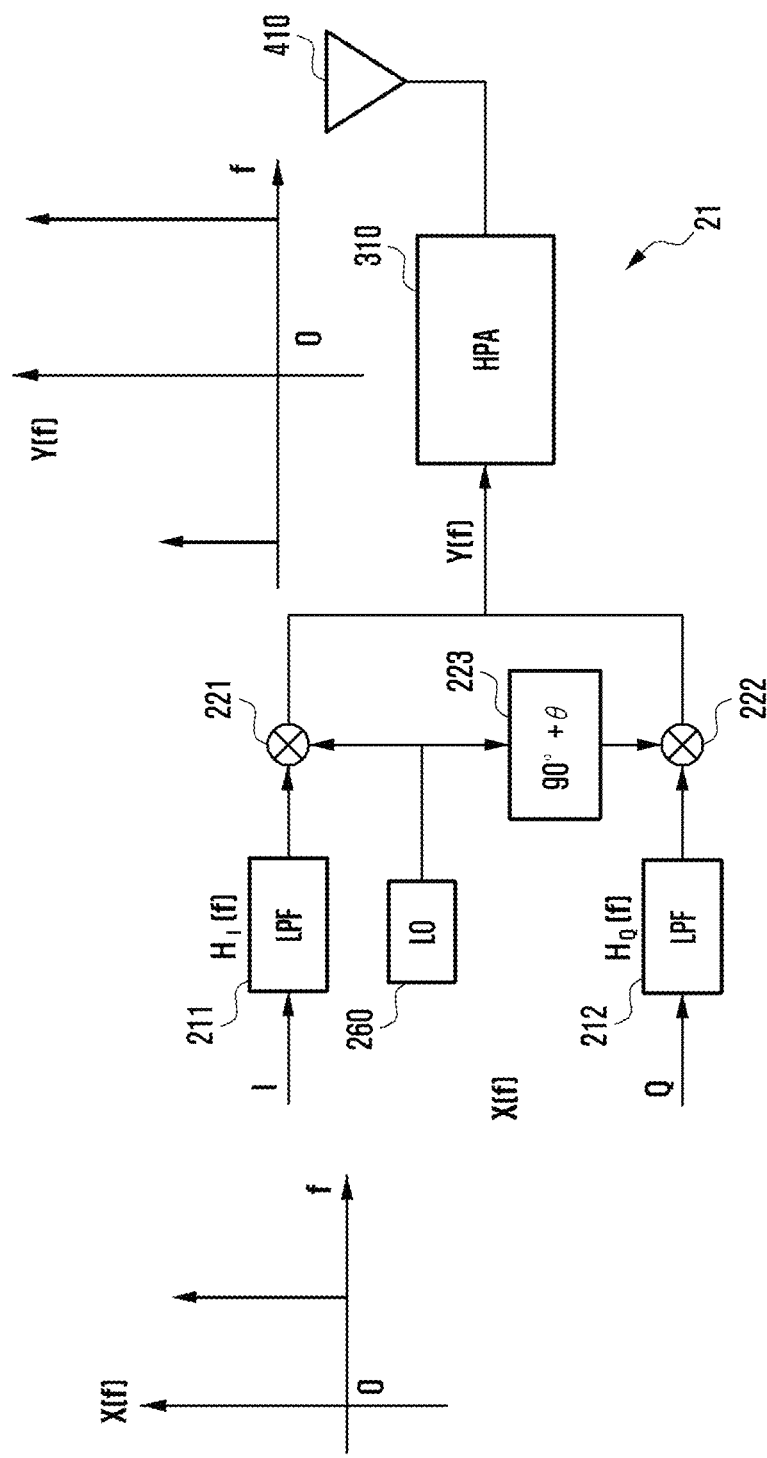
FIG. 3 is a conceptual diagram illustrating a transmitter of an electronic device in a wireless communication system according to an embodiment of the disclosure.

FIG. 3 is a conceptual diagram illustrating a transmitter of an electronic device in a wireless communication system according to an embodiment of the disclosure.

Referring to FIG. 3, a transmitter 21 of the electronic device 1 may include the first low-pass filter 211, the second low-pass filter 212, the first up mixer 221, the second up mixer 222, an I/Q converter 223, a local oscillator 260, a high power amplifier (HPA) 310, and the first antenna 410.

Figure 4:
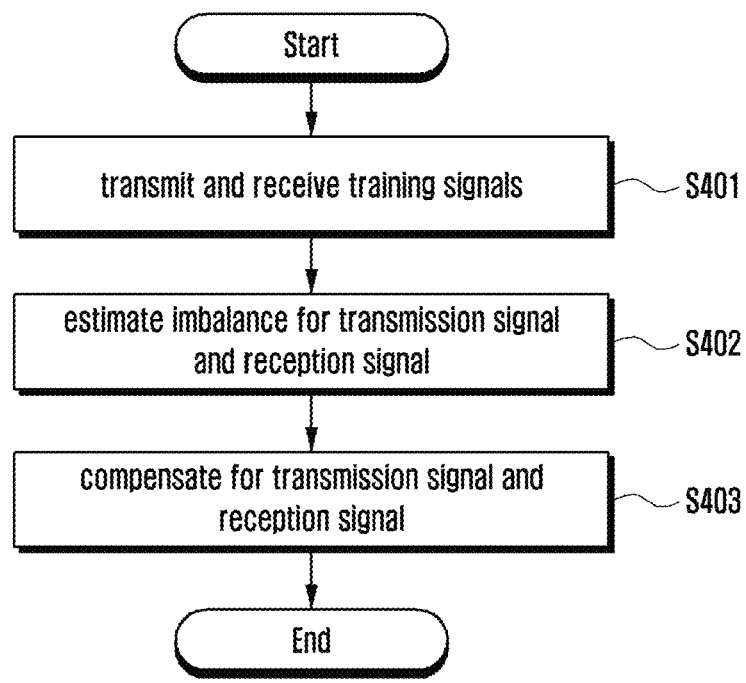
FIG. 4 is a flowchart illustrating the operation order of an electronic device in a wireless communication system according to an embodiment of the disclosure.

FIG. 4 is a flowchart illustrating the operation order of an electronic device in a wireless communication system according to an embodiment of the disclosure.

Referring to FIG. 4, the controller 10 of the electronic device 1 may transmit and receive a training signal in operation S401. The controller 10 of the electronic device 1 may transmit and receive the training signal to calibrate I/Q imbalance.

The controller 10 of the electronic device 1 may estimate imbalance for a transmission signal and a reception signal in operation S402. For example, I/Q imbalance may include phase imbalance θ generated by the I/Q converter 223 and amplitude imbalance dependent on a frequency by the first low-pass filter 211 of an I branch and the second low-pass filter 212 of a Q branch. X(f) is an input signal in a frequency domain. Y(f) is an output signal in a frequency domain. The output signal Y(f) or an imbalanced signal may be expressed as a sum of an original signal and a conjugate.

$$Y(f)=G_t(f)X(f)+C_t(f)X(-f) \quad \text{Equation 1}$$

In Equation 1, $G_t(f)$ and $G_r(f)$ denotes an imbalance coefficient, and generally corresponds to a function of the phase θ and the amplitude imbalance defined as $$\frac{H_I(f)}{H_Q(f)}.$$

The purpose of I/Q calibration is to remove the conjugate from Equation 1. That is, the controller 10 of the electronic device 1 may compensate for the original signal X(f) in a similar form as shown in Equation 2.

$$X_C(f)=X(f)-W_t(f)X^*(-f) \quad \text{Equation 2}$$

The compensated output signal may be indicated by Equation 3.

$$Y=[G_t(f)-C_t(f)W_t^*(-f)]X(f)+[G_t(f)-C_t(f)W_t(f)]X^*(-f) \quad \text{Equation 3}$$

In order to remove the image or the conjugate, a factor $W_t(f)$ referred to as a compensation filter should satisfy Equation 4.

$$G_t(f)-C_t(f)W_t(f)=0 \quad \text{Equation 4}$$

Equation 4 may be expressed as shown in Equation 5.

$$W_t(f) = \frac{C_t(f)}{G_t(f)} \quad \text{Equation 5}$$

$G_r(f)$ and $C_r(f)$ are defined as imbalance coefficients of an I/Q down-conversion reception signal (Rx). In order to remove the image, the compensation filter of the reception signal defined as $W_r(f)$ may be determined through Equation 6.

$$W_r(f) = \frac{C_r(f)}{G_r^*(-f)} \quad \text{Equation 6}$$

The controller 10 of the electronic device 1 may calibrate the transmission signal and the reception signal in operation S403. For example, the controller 10 may calibrate the transmission signal and the reception signal on the basis of the determined compensation filter.

Figure 5:
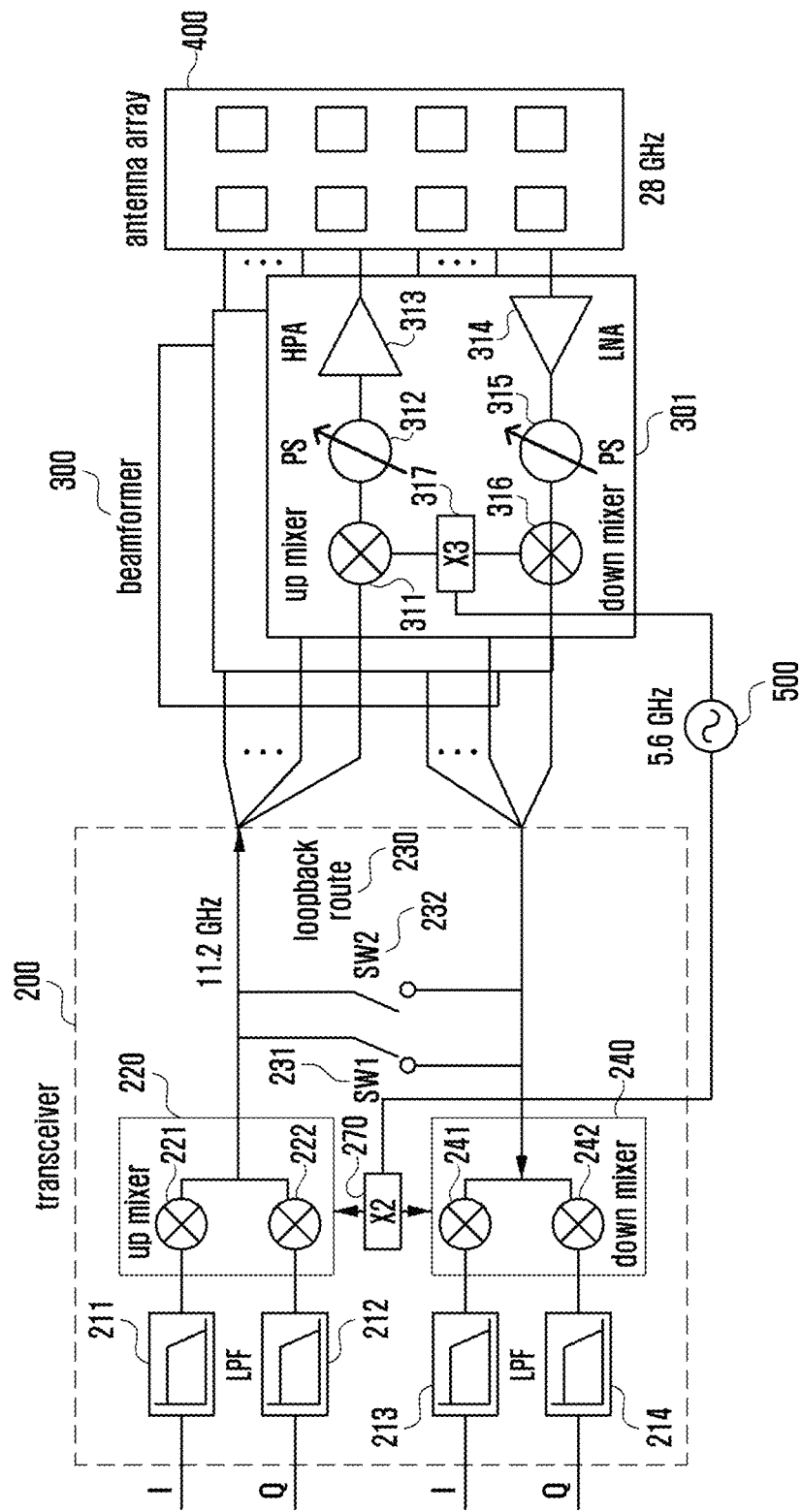
FIG. 5 is a conceptual diagram illustrating an electronic device in a wireless communication system according to an embodiment of the disclosure.

FIG. 5 is a conceptual diagram illustrating an electronic device in a wireless communication system according to an embodiment of the disclosure.

Referring to FIG. 5, the communication unit 20 of the electronic device 1 may include an RF transceiver 200, a plurality of beamformer 300, an antenna array 400, and a signal generator 500.

The RF transceiver 200 may be the same as or similar to the RF transceiver 200 of FIG. 2. The plurality of beamformers 300 may be millimeter wave beamformers operating in a frequency band of 28 GHz. The plurality of beamformers 300 may be electrically connected to the RF transceiver 200. Further, the plurality of beamformers 300 may be electrically connected to the antenna array 400.

For example, a first beamformer 301 may include an up mixer 311, a first power switch (PS) 312, a high-power amplifier 313, a low-noise amplifier 314, a second power switch 315, a down mixer 316, and an X3 interface 317.

A first end of the up mixer 311 may be electrically connected to the up mixer 220 of the RF transceiver 200 through the loopback route 230. A second end of the up mixer 311 may be electrically connected to one end of the first power switch 312. A third end of the up mixer 311 may be electrically connected to a second end of the X3 interface 317.

The one end of the first power switch 312 may be electrically connected to a second end of the up mixer 311. The other end of the first power switch 312 may be electrically connected to one end of the high-power amplifier 313.

The one end of the high-power amplifier 313 may be electrically connected to the other end of the first power switch 312. The other end of the high-power amplifier 313 may be electrically connected to the antenna array 400.

One end of the low-noise amplifier 314 may be electrically connected to the other end of the second power switch 316. The other end of the low-noise amplifier 314 may be electrically connected to the antenna array 400.

One end of the second power switch 316 may be electrically connected to the other end of the down mixer 316. The other end of the second power switch 316 may be electrically connected to the one end of the low-noise amplifier 314.

A first end of the down mixer 316 may be electrically connected to the down mixer 240 of the RF transceiver 200 through the loopback route 230. A second end of the down mixer 316 may be electrically connected to one end of the second power switch 316. A third end of the down mixer 316 may be electrically connected to a third end of the X3 interface 317.

A first end of the X3 interface 317 may be electrically connected to the end of the signal generator 500. A second end of the X3 interface 317 may be electrically connected to the third end of the up mixer 311. A third end of the X3 interface 317 may be electrically connected to a third end of the down mixer 316.

One end of the signal generator 500 may be electrically connected to a third end of the X2 interface 270. The other end of the signal generator 500 may be electrically connected to the first end of the X3 interface 317.

A first end of the X2 interface 270 may be electrically connected to the up mixer 220. A second end of the X2 interface 270 may be electrically connected to the down mixer 240. The third end of the X2 interface 270 may be electrically connected to one end of the signal generator 500.

The electronic device 1 according to an embodiment may extract compensation filters, $W_t(f)$, and $W_r(f)$. Referring to FIG. 4, the RF transceiver 200 may transfer a signal in a bandwidth of 1.4 GHz based on 11.2 GHz to the plurality of beamformers 300. The RF transceiver 200 may have a loopback structure including two separated loopback routes 230. The controller 10 may activate a transmission mode or a calibration mode by controlling the first switch 231 and the second switch 232 of the RF transceiver 200. For example, the controller 100 may activate the transmission mode or the calibration mode by controlling on/off of the first switch 231 and the second switch 232.

Figure 6:
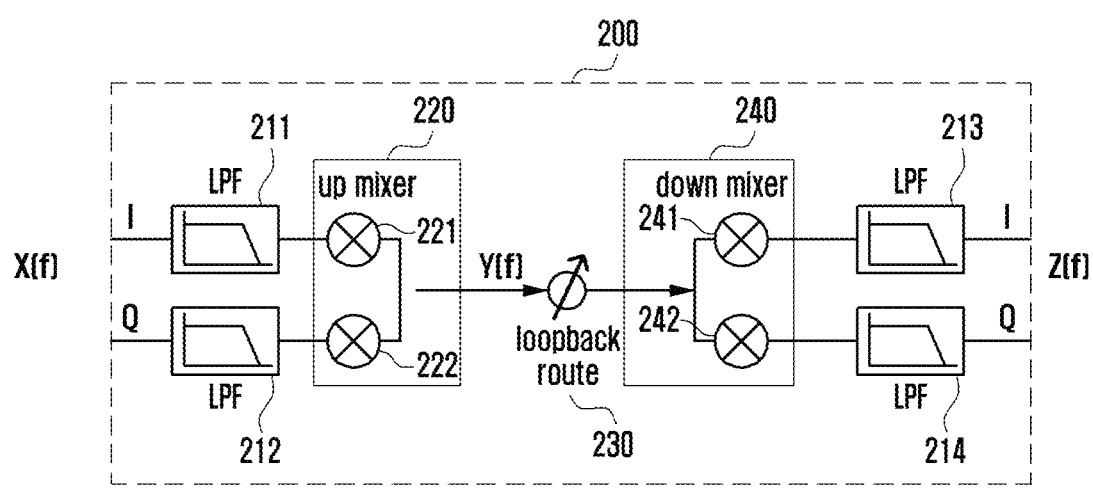
FIG. 6 is a conceptual diagram illustrating an RF transceiver in a wireless communication system according to an embodiment of the disclosure.

FIG. 6 is a conceptual diagram illustrating an RF transceiver in a wireless communication system according to an embodiment of the disclosure.

Referring to FIG. 6, the loopback route 230 of the RF transceiver 200 may be modeled by a phase shifter.

Figure 7:
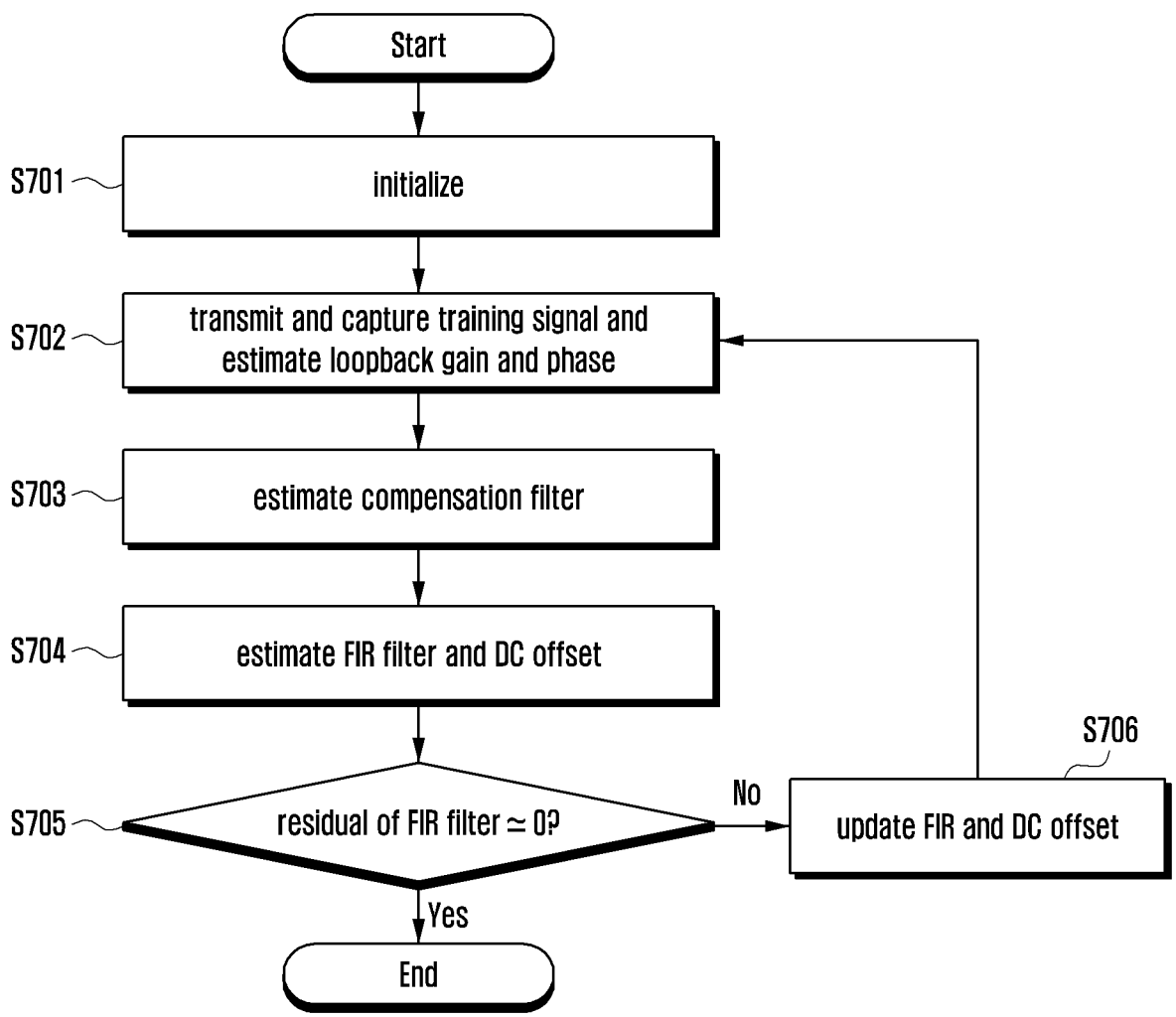
FIG. 7 is a flowchart illustrating the operation order of an electronic device in a wireless communication system according to an embodiment of the disclosure.

FIG. 7 is a flowchart illustrating an operation order of an electronic device according to an embodiment of the disclosure.

Referring to FIG. 7, the controller 10 of the electronic device 1 may perform an initialization operation S701 for calibrating I/Q imbalance.

The controller 10 of the electronic device 1 may transmit and capture a training signal, and estimate a loopback gain and a phase in operation S702. For example, the controller 10 of the electronic device 1 may model a transfer function as shown in Equation 7.

$$P(f) = g(f)e^{j\phi(f)} \qquad \text{Equation 7}$$

In Equation 7, g(f) denotes a gain response. φ(f) denotes a phase response.

A change in the phase and the gain for a bandwidth may be ignored. At this time, the loopback response may be indicated by Equation 8.

$$P = ge^{j\phi} \qquad \text{Equation 8}$$

The output signal Z(f) may be indicated by Equation 9.

$$(f) = ge^{j\phi}G_r(f)(G_t(f)X(f)+C_t(f)X^*(-f))+ge^{-j\phi}C_r(f)(G_t^*(-f)X^*(-f)+C_t^*(-f)X(f)) \qquad \text{Equation 9}$$

Equation 9 may be expressed as Equation 10.

$$Z(f)=ge^{j\phi}X(f)G_r(f)G_t(f)+ge^{-j\phi}X(f)C_r(f)C_t^*(-f)+ge^{j\phi}X^*(-f)G_r(f)C_t(f)+ge^{-j\phi}X^*(-f)C_r(f)G_t^*(-f) \qquad \text{Equation 10}$$

The variables $x_{1-4}$ are defined as Equation 11.

$$\begin{cases} x_1 = G_r(f)G_t(f) \\ x_2 = C_r(f)C_t^*(-f) \\ x_3 = G_r(f)C_t(f) \\ x_4 = C_r(f)G_t^*(-f) \end{cases} \qquad \text{Equation 11}$$

The output signal may be expressed as functions of four variables as shown in Equation 12.

$$Z(f)=ge^{j\phi}X(f)x_1+ge^{-j\phi}X(f)x_2+ge^{j\phi}X^*(-f)x_3+ge^{-j\phi}X^*(-f)x_4 \qquad \text{Equation 12}$$

The controller 10 of the electronic device 1 may estimate a compensation filter in operation S703. For example, the controller 10 may determine a compensation filter for a transmission signal and a compensation filter for a reception signal in a frequency domain.

For example, in order to remove an image part from the output signal, the controller 10 may control training signals to be transmitted and received through the loopback route 230 so as to determine a compensation filter ($W_t$) for a transmission signal and a compensation filter ($W_r$) for a reception signal in a frequency domain.

For example, the controller 10 may determine the compensation filter ($W_t$) for the transmission signal and the compensation filter ($W_r$) for the reception signal on the basis of training signals designed through Equation 13 and Equation 14.

For example, when values corresponding to $x_{1-4}$ in Equation 11 and Equation 12 exist, the controller 10 may determine compensation filters through Equation 13 and Equation 14.

$$W_t(f) = \frac{C_t(f)}{G_t(f)} = \frac{x_3}{x_1} \qquad \text{Equation 13}$$

$$W_r(f) = \frac{C_r(f)}{G_r^*(-f)} = \frac{x_4}{x_1^*} \qquad \text{Equation 14}$$

$x_1$, $x_2$, $x_3$, $x_4$, denote $G_r(f)G_t(f)$, $C_r(f)C_r^*(-f)$, $G_r(f)C_t(f)$ and $C_r(f)G_t^*(-f)$. $G_r$, $C_r$, $G_t$ and $C_t$ denote imbalance coefficients in a transmitter and a receiver.

In order to solve four variables in Equation 11, equations that can be obtained through transmission of two different training signals $X_A(f)$ and $X_B(f)$ through two different characteristic loopback routes 230, that is, $g_1 e^{j\Phi_1}$ and $g_2 e^{j\Phi_2}$ may be considered. For example, Equation 15 may be considered.

$$Z = Ax \qquad \text{Equation 15}$$

In Equation 15, Z denotes a received signal vector and may be expressed by Equation 16. A denotes a matrix and may be expressed by Equation 17. x denotes a variable vector and may be expressed by Equation 18.

$$Z = [Z_1 \ Z_2 \ Z_3 \ Z_4]^T \qquad \text{Equation 16}$$

$$x = [x_1 \ x_2 \ x_3 \ x_4]^T \qquad \text{Equation 17}$$

$$A = \begin{bmatrix} g_1 e^{j\phi_1} X_A & g_1 e^{-j\phi_1} X_A & g_1 e^{j\phi_1} X_A^* & g_1 e^{-j\phi_1} X_A^* \\ g_1 e^{j\phi_1} X_B & g_1 e^{-j\phi_1} X_B & g_1 e^{j\phi_1} X_B^* & g_1 e^{-j\phi_1} X_B^* \\ g_2 e^{j\phi_2} X_A & g_2 e^{-j\phi_2} X_A & g_2 e^{j\phi_2} X_A^* & g_2 e^{-j\phi_2} X_A^* \\ g_2 e^{j\phi_2} X_B & g_2 e^{-j\phi_2} X_B & g_2 e^{j\phi_2} X_B^* & g_2 e^{-j\phi_2} X_B^* \end{bmatrix}, \qquad \text{Equation 18}$$

$X_A(f)$ is expressed as $X_A$. $X_A^*(-f)$ is expressed as $X_A^*$.

The controller 10 may determine a variable vector x through Equation 13 by designing detailed training signals.

Figure 8:
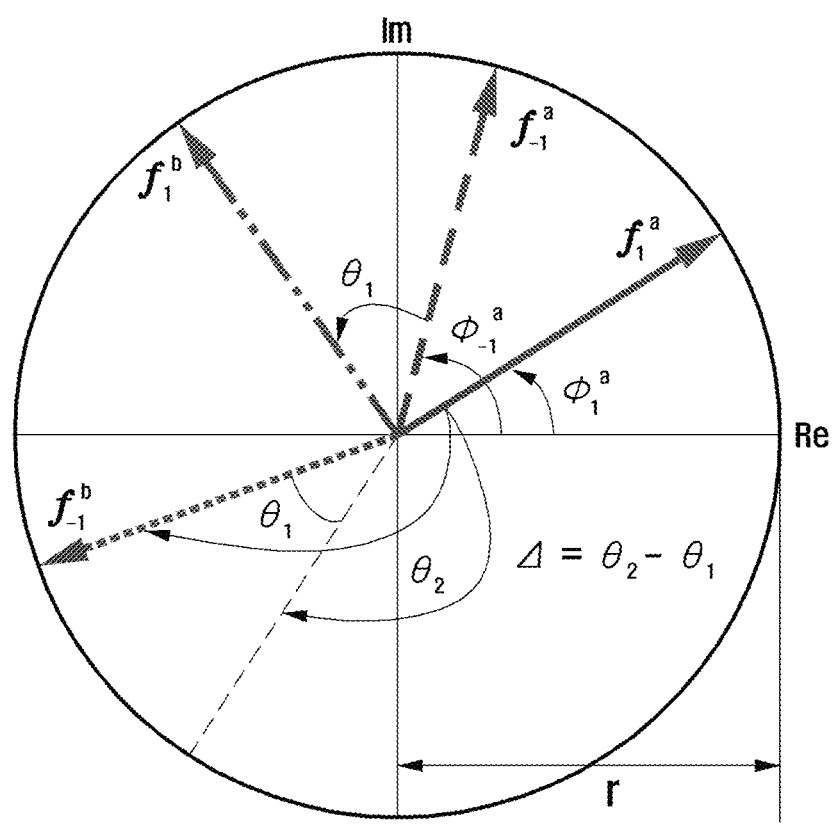
FIG. 8 is a conceptual diagram illustrating a training signal designed to have a specific phase relation in a frequency domain of a wireless communication system according to an embodiment of the disclosure.

FIG. 8 is a conceptual diagram illustrating a training signal designed to have a specific phase relation in a frequency domain of a wireless communication system according to an embodiment of the disclosure.

Figure 9:
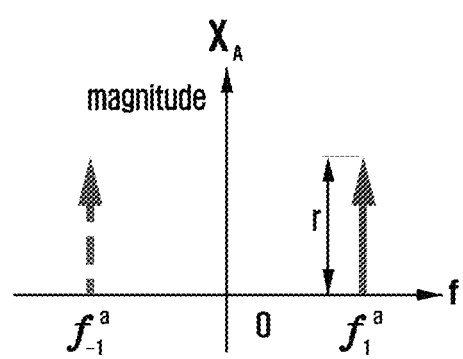
FIG. 9 is a conceptual diagram illustrating the magnitude of a training signal in a wireless communication system according to an embodiment of the disclosure.
Figure 9:
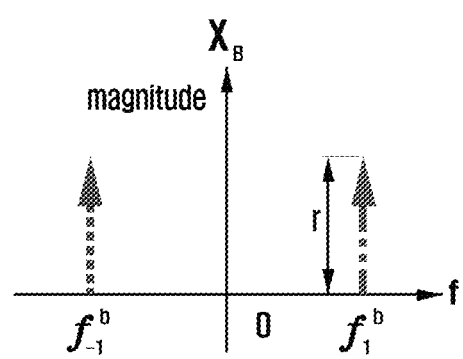

FIG. 9 is a conceptual diagram illustrating the magnitude of a training signal in a wireless communication system according to an embodiment of the disclosure.

Referring to FIG. 8, in the assumption of $g_1 = g_2 = 1$, a determinant of the matrix A indicated by det(A) may be converted to Equation 19.

$$\det(A) = (X_A(f) X_B^*(-f) - X_A^*(-f))^2 (2 - e^{j(2\Delta_{LB})} - e^{-j(2\Delta_{LB})}) \qquad \text{Equation 19}$$

In Equation 19, $\Delta_{LB} = \phi_1 - \phi_2$ is a phase difference between two loopback routes. $X_A$ and $X_B$ are training signals through two different loopback routes. Further, the controller 10 may design training signals by evaluating the determinant of the matrix A in Equation 19. The controller 10 may design and control entries of the training signals in detail Training signals may be designed such that det(A) satisfies the conditions as Equation 20.

$$\begin{cases} \det(A) \neq 0 \\ |\det(A)| \text{ as high as possible} \end{cases} \qquad \text{Equation 20}$$

Two vector training signals may be defined as $X_A(f)$ and $X_B(f)$. Referring to FIG. 8, two frequency components $f_1^a = -f_{-1}^a$; $f_1^b = -f_{-1}^b$ that are mutual images of the vector training signals may exist. Further, all components may have the same magnitude r and predetermined phases. The training signals may be expressed as Equation 21 and Equation 22.

$$X_A(f_1^a, f_{-1}^a) = [re^{j\phi_1^a}, re^{j\phi_{-1}^a}] \qquad \text{Equation 21}$$

$$X_B(f_1^b, f_{-1}^b) = [re^{j\phi_1^b}, re^{j\phi_{-1}^b}] \qquad \text{Equation 22}$$

A difference between phase terms may be expressed as Equation 23 and Equation 24.

$$\phi_1^b - \phi_{-1}^a = \theta_1 \qquad \text{Equation 23}$$

$$\phi_1^a - \phi_{-1}^b = \theta_2 \qquad \text{Equation 24}$$

A difference between phase terms may be expressed as Equation 25.

$$\theta_2 - \theta_1 = \Delta \qquad \text{Equation 25}$$

The determinant of Equation 19 may be an intuitive function of the loopback phase difference $\Delta_{LB}$ and the phase difference $\Delta$ between training signals.

FIG. 9 is a conceptual diagram illustrating a determinant in a wireless communication system according to an embodiment of the disclosure.

Referring to FIG. 9, the determinant may vary depending on $\Delta$ and $\Delta_{LB}$. When a condition of Equation 26 is satisfied, the determinant of A may have a maximum value.

$$\begin{cases} |\Delta_{LB}| = 90° \\ |\Delta| = 180° \end{cases} \qquad \text{Equation 26}$$

It is assumed to design a loopback route such that $|\Delta_{LB}|$ approaches 90° and the phase difference $\Delta$ between training signals can be selected to provide the determinant A.

Figure 10:
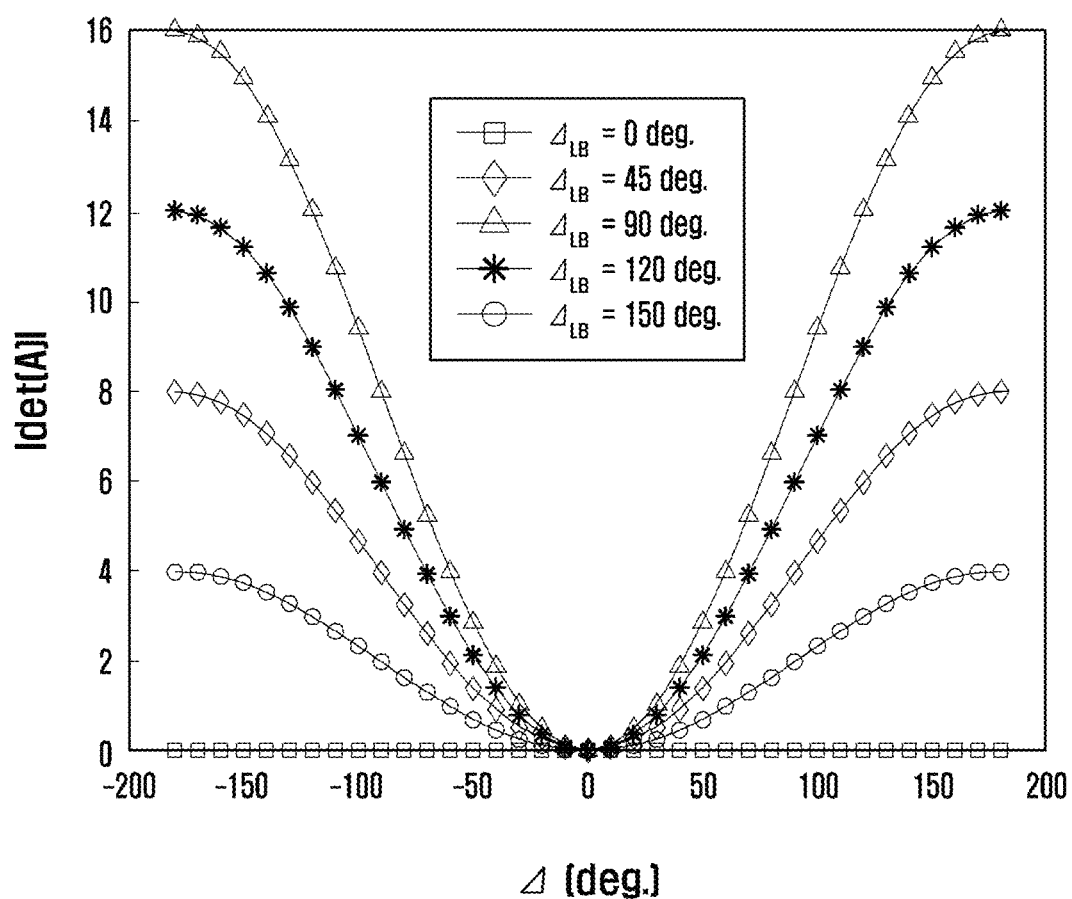
FIG. 10 is a conceptual diagram illustrating a determinant in a wireless communication system according to an embodiment of the disclosure.

FIG. 10 is a conceptual diagram illustrating a training signal used in a wireless communication system according to an embodiment of the disclosure.

Referring to FIG. 10, in the case of $\Delta = 180°$, a component $f_1^b$ of the training signal may have a phase larger by 45° from $f_{-1}^a$. Further, a component $f_{-1}^b$ of the training signal may have a phase smaller by 225° from $f_1^a$.

Figure 11:
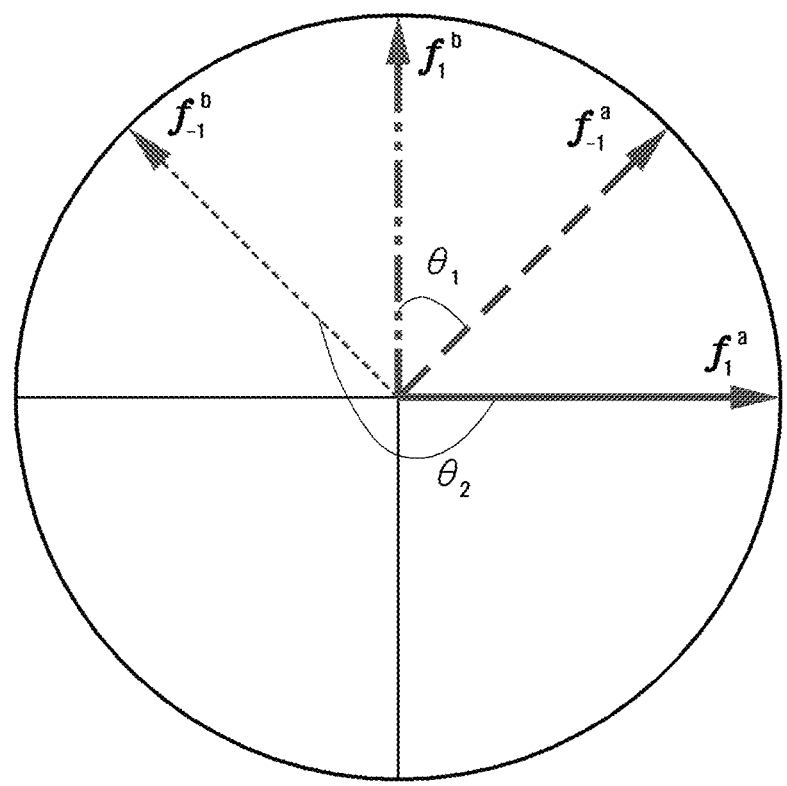
FIG. 11 is a conceptual diagram illustrating a training signal used in a wireless communication system according to an embodiment of the disclosure.

FIG. 11 is a conceptual diagram illustrating a training signal used in a wireless communication system according to an embodiment of the disclosure.

Referring to FIG. 11, the component $f_1^b$ of the training signal of $\Delta = 180°$ may have a phase larger by 115° from $f_{-1}^a$. Further, the component $f_{-1}^b$ of the training signal may have a phase smaller by 315° from $f_1^a$.

For example, the controller 10 may determine the variable vector x using designed training signals through Equation 17. The controller 10 may determine compensation filters through Equation 13 and Equation 14.

Referring back to FIG. 7, the controller 10 of the electronic device 1 may estimate a Finite Impulse Response (FIR) filter and a DC offset in operation S704. For example, the FIR filter may be used to covert a signal in a frequency domain to a signal in a time domain.

A length of the FIR filter w may be M. M may be an odd number. Frequency response compensation filters for a transmission signal or a reception signal sampled in the given frequency $\omega_n$ may be expressed as Equation 3.

For example, when the length of the FIR filter w is M (M being an odd number), frequency response compensation filters for the transmission signal or the reception signal that is sampled in the given frequency $\omega_n$ and determined through Equation 13 and Equation 14 may be expressed as Equation 27.

$$W(\omega_n) = \Sigma_{k=-(M-1)/2}^{(M-1)/2} w_k e^{-j\omega n_k} \qquad \text{Equation 27}$$

N point frequency sampling $\omega_n$ (n=1~N) may be expressed as Equation 27. For example, Equation 28 to Equation 30 may be derived from N frequency points sampled through a bandwidth $\omega_n$(n=1~N).

$$W = Aw \qquad \text{Equation 28}$$

$$A_{N \times M} = \begin{bmatrix} e^{-j\omega_1(-\frac{M-1}{2})} & \cdots & e^{-j\omega_1(\frac{M-1}{2})} \\ \vdots & \ddots & \vdots \\ e^{-j\omega_n(-\frac{M-1}{2})} & \cdots & e^{-j\omega_n(\frac{M-1}{2})} \end{bmatrix} \qquad \text{Equation 29}$$

$$W_{N \times 1} = \begin{bmatrix} W(\omega_1) \\ \cdots \\ W(\omega_N) \end{bmatrix} \qquad \text{Equation 30}$$

The controller 10 may estimate the FIR filter w using the least square method as shown in Equation 31.

$$\hat{w} = \text{argmin } \|Aw - W\|^2 \qquad \text{Equation 31}$$

Equation 31 may be expressed by Equation 32.

$$\hat{w} = [(A^T A)^{-1} A^T] W \qquad \text{Equation 32}$$

The controller 10 of the electronic device 1 may determine whether a residual of FIR filters approach 0 in operation S705. The controller 10 of the electronic device 1 may terminate the operation when the residual of FIR filters approach 0.

The controller 10 of the electronic device 1 may update the FIR filters and the DC offset when the FIR filters do not approach 0 in operation S706. The controller 10 may calibrate the transmission signal (Tx) and the reception signal (Rx) in common by updating the FIR filters and the DC offset. The controller 10 of the electronic device 1 may repeatedly perform operations S702 to S705 by returning to operation S702 after updating the FIR filters and the DC offset.

Figure 12:
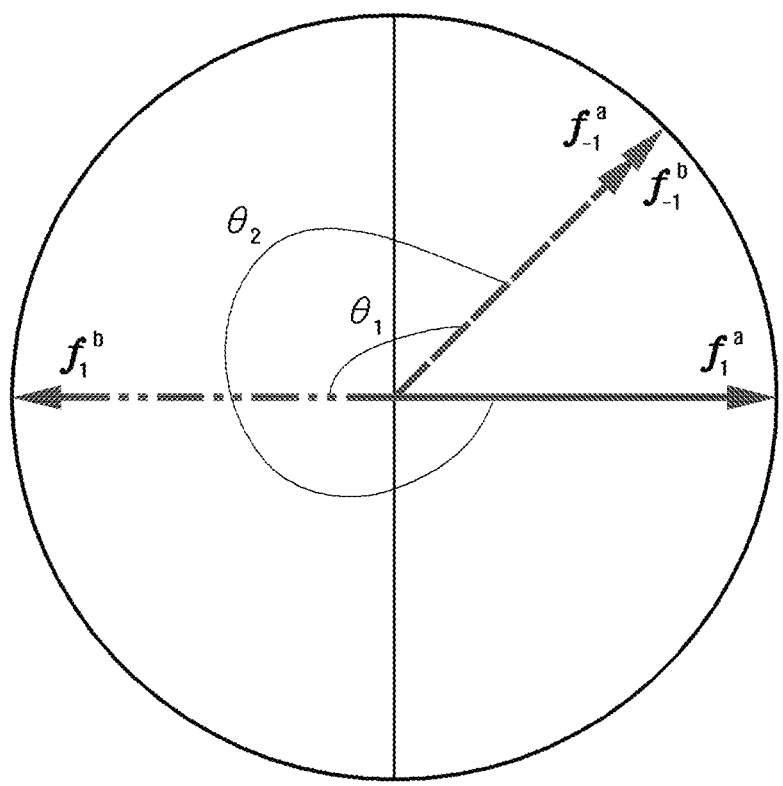
FIG. 12 is a conceptual diagram illustrating a training signal used in a wireless communication system according to an embodiment of the disclosure.

FIG. 12 is a conceptual diagram illustrating a training signal used in a wireless communication system according to an embodiment of the disclosure.

Referring to FIG. 12, a bandwidth BW of a wireless communication system may be 1.4 GHz. The bandwidth may aggregate 14 carrier components having a bandwidth of 100 MHz. A sampling frequency may be $F_S$=1.96608 GHz. The magnitude of Fast Fourier Transform (FFT) and Inverse Fast Fourier Transform (IFFT) may be selected NFFT=512. Each of training signals $X_A$ and $X_B$ may include 512 frequency components. Frequencies within the band of the wireless communication system may be uniformly distributed over the entire bandwidth. Each frequency component may be divided by 15.36 MHz for the required SNR and may become a frequency component within a total of 92 bands. Training signals in the frequency domain are converted to training signals in the time domain using IFFT, concatenated, and doubled to form 2048 samples, or equivalent to 1.04 μs time duration. Imbalance independent from the frequency may be selected as follows. Phase imbalance may be $\theta_t$=5° and $\theta_r$=5° in a transmitter and a receiver, respectively. Imbalance dependent on the frequency may be simulated by Butterworth low-pass filters for selecting different cut-off frequencies. In the case of the transmitter, LPF cut-off frequencies of I and Q branches may be selected as $f_I^{Tx}$=700 MHz and $f_Q^{Tx}$=703 MHz. In the case of the receiver, LPF cut-off frequencies of I and Q branches may be selected as $f_I^{Rx}$=704 MHz and $f_q^{Tx}$=700 MHz. Loopback phases of two routes may be selected to have a difference of $\Delta_{LB}$=90°. 2048 samples of the training signals may be input through two different loopback routes. Signals received thereafter may be used to determine compensation filters as shown in Equation 18 and Equation 19. The FIR filter w may be estimated through Equation 37 to match a required frequency response, that is, $W_t$ or $W_r$. The method of calibrating I/Q imbalance according to an embodiment may remove an image through a modulated signal in a bandwidth of 100 MHz.

Figure 13:
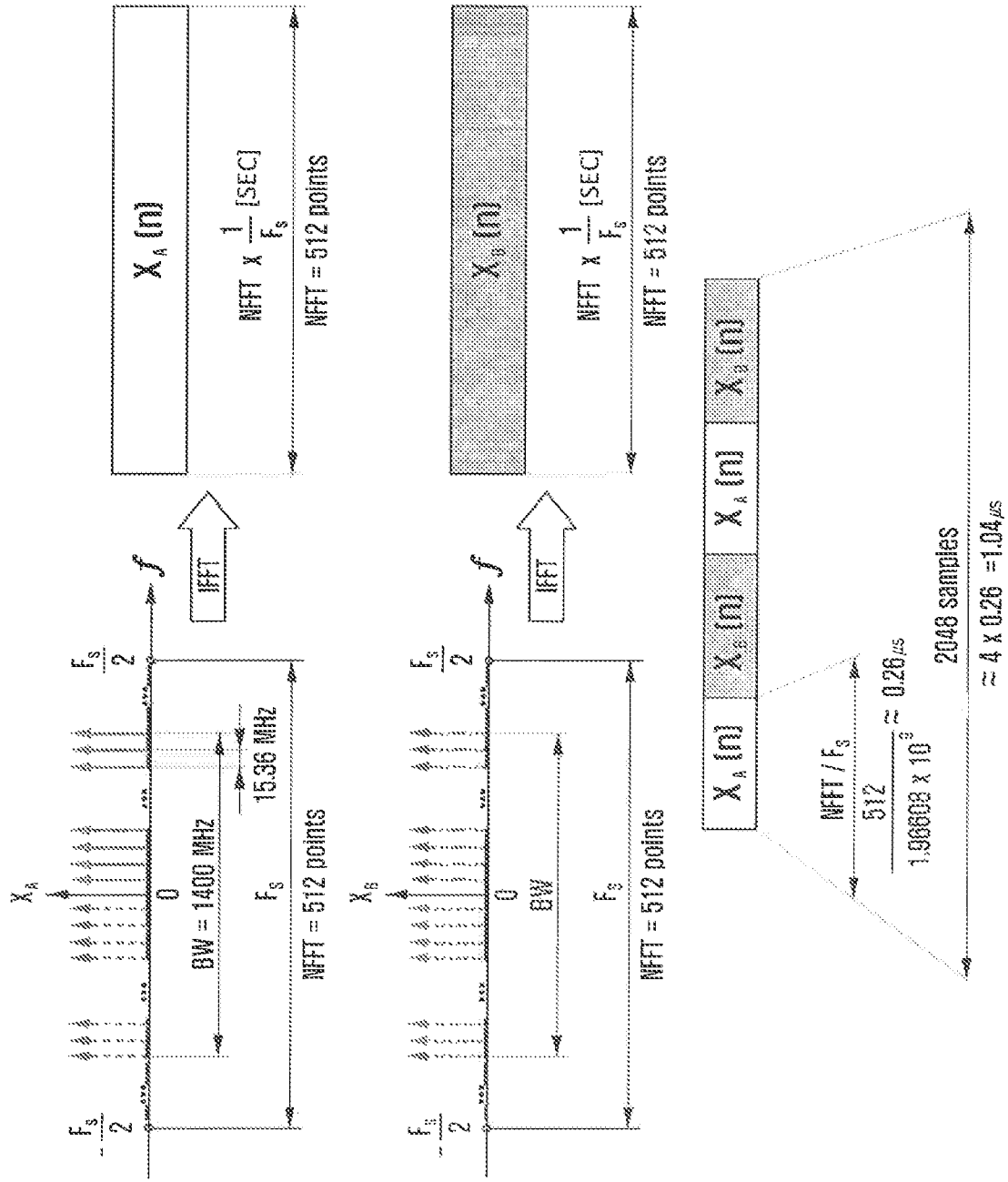
FIG. 13 is a conceptual diagram illustrating a training signal used in a wireless communication system according to an embodiment of the disclosure.

FIG. 13 is a conceptual diagram illustrating a training signal used in a wireless communication system according to an embodiment of the disclosure.

Figure 14:
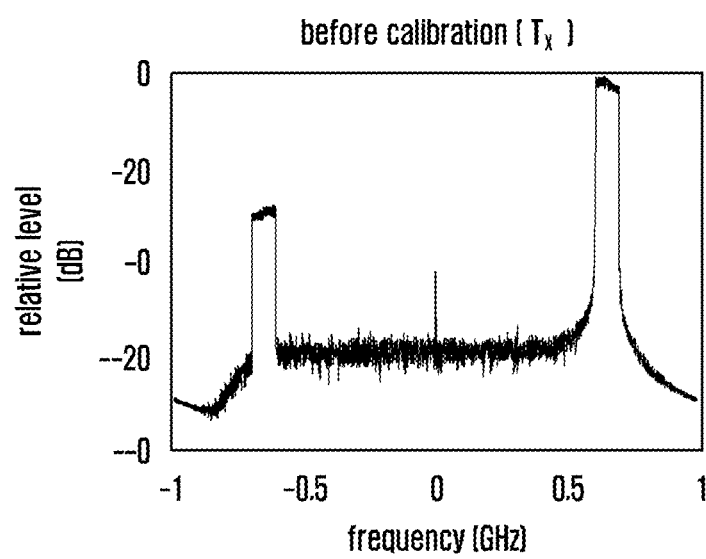
FIG. 14 is a graph illustrating a power spectrum density (PSD) of a transmission signal before calibration in a wireless communication system according to an embodiment of the disclosure.

FIG. 14 is a graph illustrating a power spectrum density (PSD) of a transmission signal before calibration in a wireless communication system according to an embodiment of the disclosure.

Figure 15:
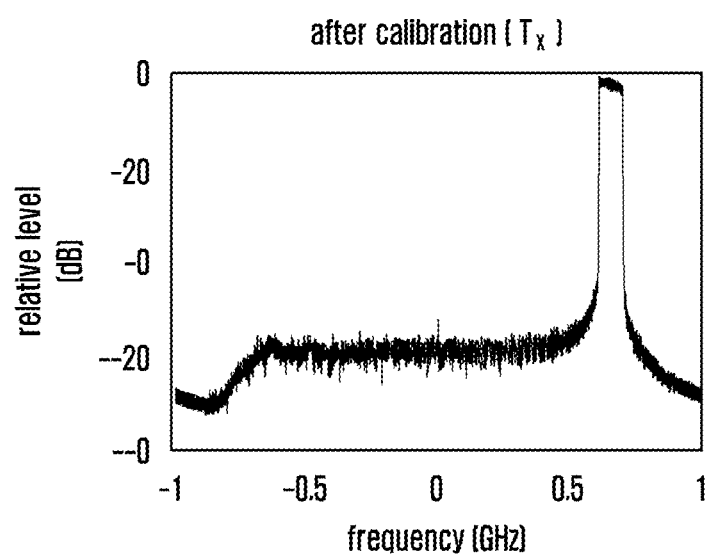
FIG. 15 is a graph illustrating a power spectrum density of a transmission signal after calibration in a wireless communication system according to an embodiment of the disclosure.

FIG. 15 is a graph illustrating a power spectrum density of a transmission signal after calibration in a wireless communication system according to an embodiment of the disclosure.

Figure 16:
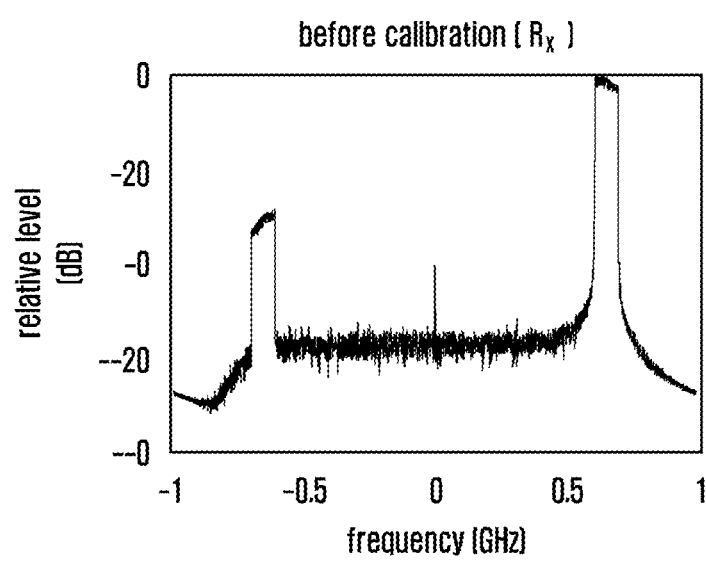
FIG. 16 is a graph illustrating a power spectrum density (PSD) of a reception signal before calibration in a wireless communication system according to an embodiment of the disclosure.

FIG. 16 is a graph illustrating a power spectrum density (PSD) of a reception signal before calibration in a wireless communication system according to an embodiment of the disclosure.

Figure 17:
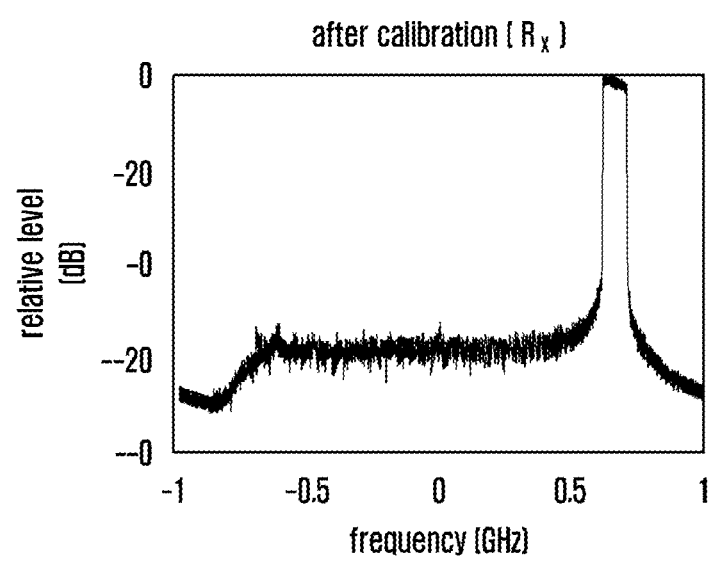
FIG. 17 is a graph illustrating a power spectrum density of a reception signal after calibration in a wireless communication system according to an embodiment of the disclosure.

FIG. 17 is a graph illustrating a power spectrum density of a reception signal after calibration in a wireless communication system according to an embodiment of the disclosure.

Referring to FIGS. 14 and 16, IRR of the transmission signal and the reception signal before calibration may be about 30 dB.

Referring to FIGS. 15 and 17, after calibration, images may be all suppressed to a noise level.

Figure 18:
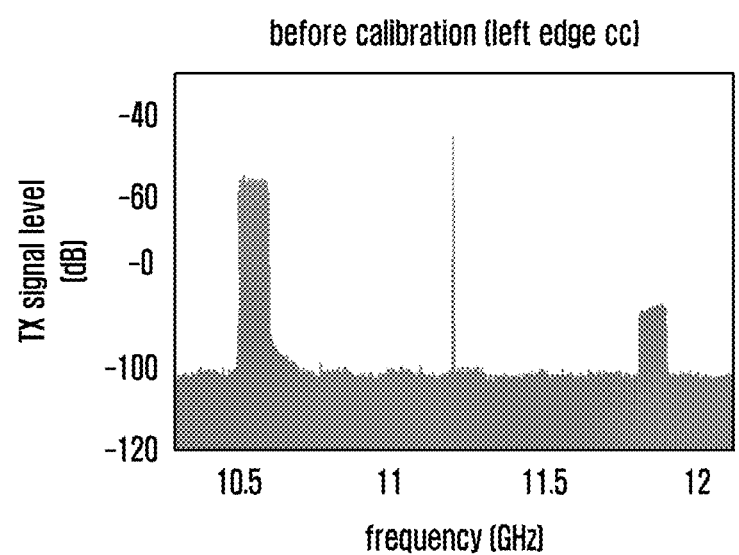
FIG. 18 is a graph illustrating a left edge carrier component before calibration in a wireless communication system according to an embodiment of the disclosure.

FIG. 18 is a graph illustrating a left edge carrier component before calibration in a wireless communication system according to an embodiment of the disclosure.

Figure 19:
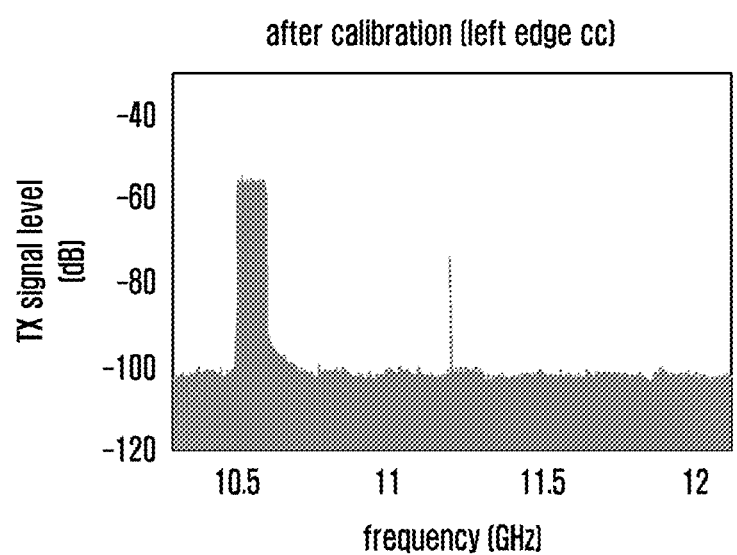
FIG. 19 is a graph illustrating a left edge carrier component after calibration in a wireless communication system according to an embodiment of the disclosure.

FIG. 19 is a graph illustrating a left edge carrier component after calibration in a wireless communication system according to an embodiment of the disclosure.

Figure 20:
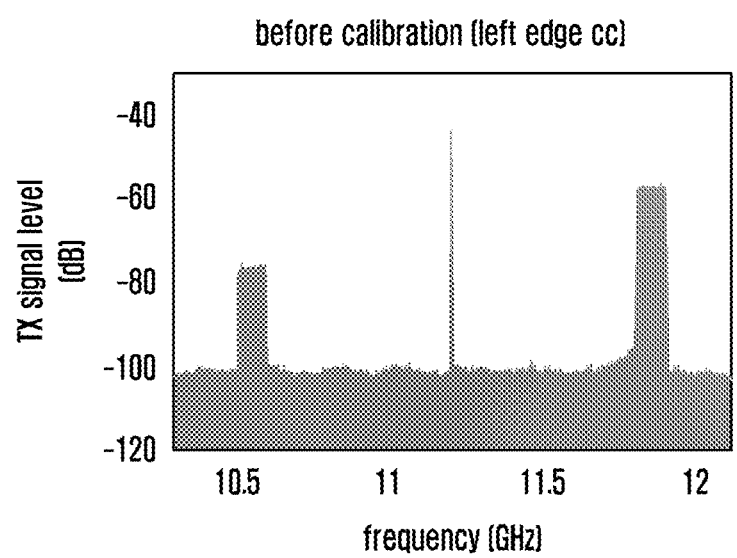
FIG. 20 is a graph illustrating a right edge carrier component before calibration in a wireless communication system according to an embodiment of the disclosure.

FIG. 20 is a graph illustrating a right edge carrier component before calibration in a wireless communication system according to an embodiment of the disclosure.

Figure 21:
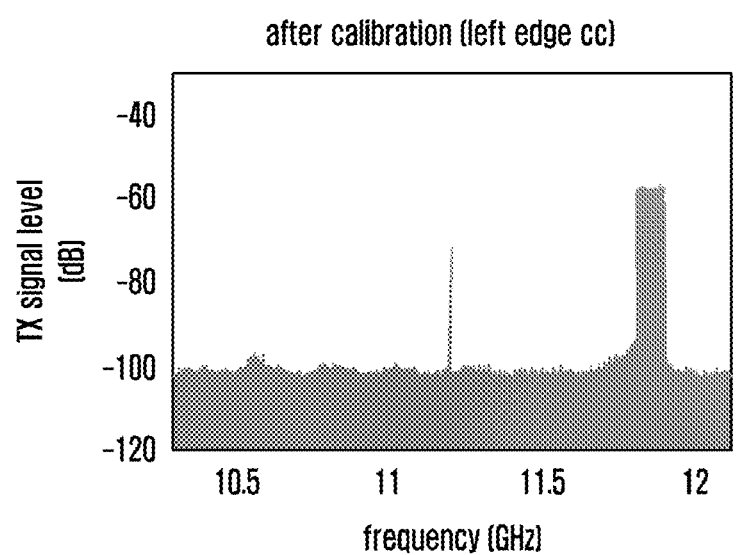
FIG. 21 is a graph illustrating a right edge carrier component after calibration in a wireless communication system according to an embodiment of the disclosure.

FIG. 21 is a graph illustrating a right edge carrier component after calibration in a wireless communication system according to an embodiment of the disclosure.

Referring to FIGS. 18 and 20, uncompensated spectrum of a 5 G-NR signal in a bandwidth of 10 MHz placed in 650.13 MHz and −650.13 MHz or a left edge carrier component are illustrated. The left and right edge carrier components may clearly appear in the opposite side of the center frequency with IRR of about 19 dB and 32 dB, respectively, or difference of 13 dB. This means that imbalance significantly depends on the frequency.

Referring to FIGS. 19 and 21, calibrated signals are illustrated. It is shown that images of the calibrated signals are suppressed to the noise level, and the performance of the I/Q calibration method according to an embodiment may be identified.

Figure 22:
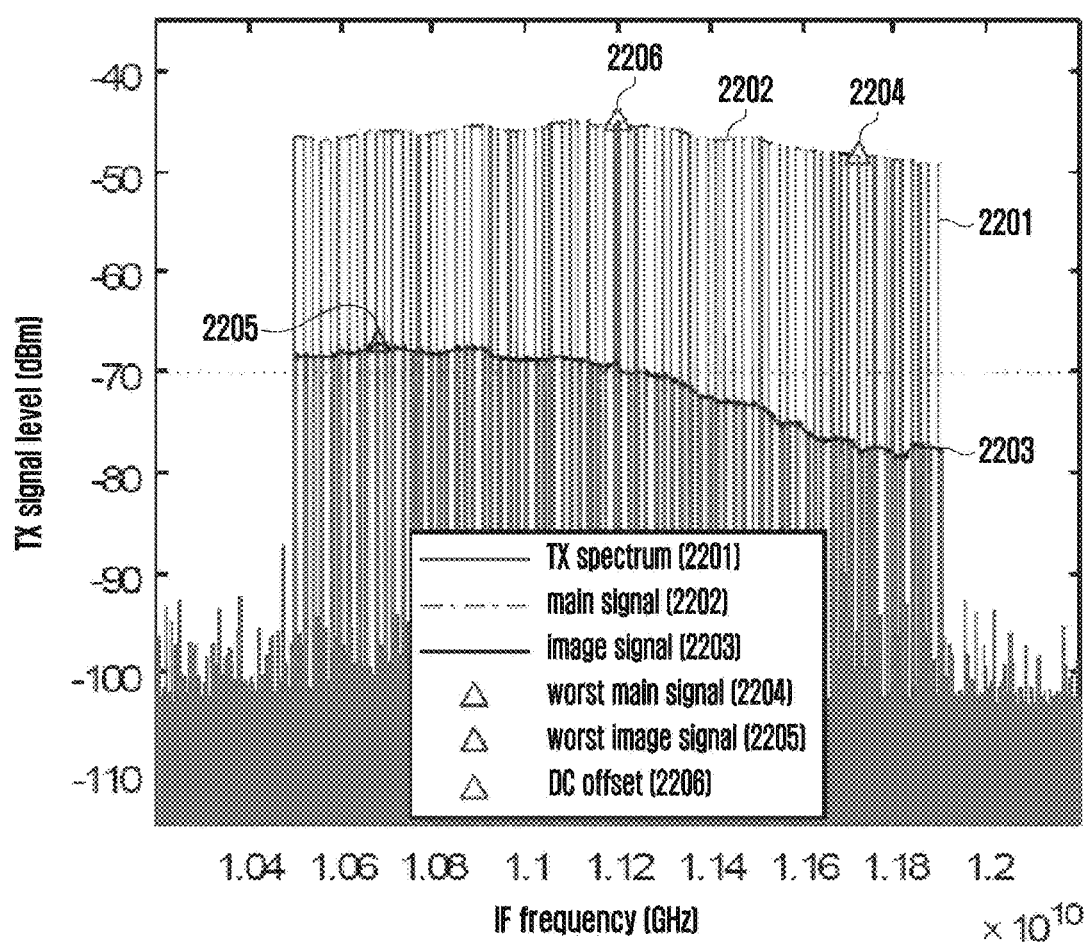
FIG. 22 is a conceptual diagram illustrating a multi-tone transmission signal higher than or equal to a bandwidth of 1.4 GHz before calibration in a wireless communication system according to an embodiment of the disclosure.

FIG. 22 is a conceptual diagram illustrating a multi-tone transmission signal in a bandwidth higher than or equal to 1.4 GHz bandwidth before calibration in a wireless communication system according to an embodiment of the disclosure.

Referring to FIG. 22, the multi-tone signal may be generated through separation of spectrum tones and images of the spectrum tones. For example, an image signal may significantly vary in a left bandwidth at a highest level or −72 dBm and a right lowest level or −80 dBm.

Figure 23:
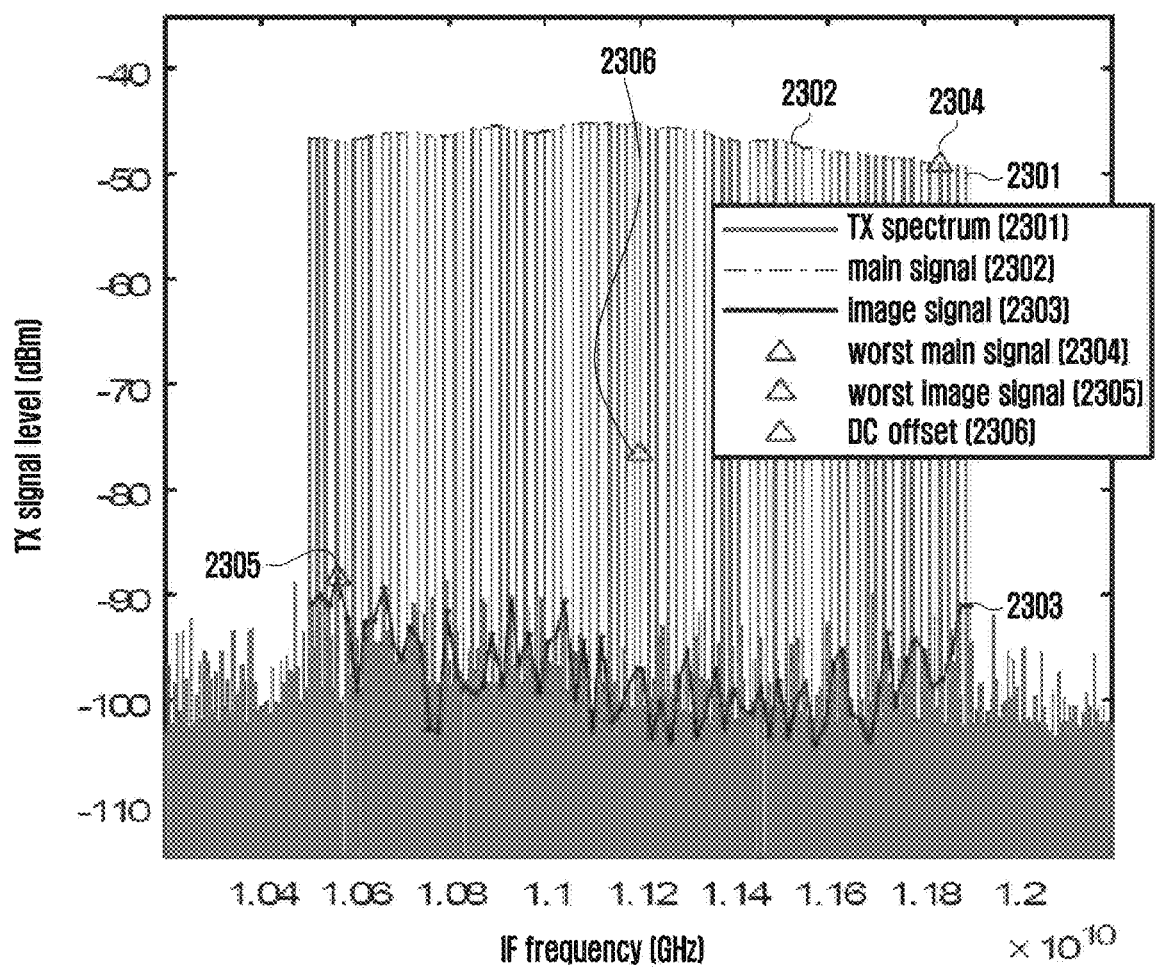
FIG. 23 is a conceptual diagram illustrating a multi-tone transmission signal higher than or equal to a bandwidth of 1.4 GHz after calibration in a wireless communication system according to an embodiment of the disclosure.

FIG. 23 is a conceptual diagram illustrating a multi-tone transmission signal in a bandwidth higher than or equal to 1.4 GHz bandwidth after calibration in a wireless communication system according to an embodiment of the disclosure.

Referring to FIG. 23, the worst IRR may be 40 dB, and the average IRR in a bandwidth 1.4 GHz may be 48 dB. The result of FIG. 21 may correspond to FIGS. 19 and 21 in which the image of the modulated signal in bandwidth 100 MHz is suppressed to the noise level. That is, the method of calibrating the I/Q signal according to an embodiment in the wireless communication system in which the average SNR is lower than 40 dB may provide the robust performance.

The disclosure provides a calibration method of estimating and compensating for frequency-dependent imbalance of the transmitter and the receiver. The method may be based on a design of specific training signals related to the loopback hardware structure for acquiring analysis solutions of compensation filters. Simulation and measurement with a commercial 5 G transceiver chipset may show that the proposed technique can accurately estimate the frequency-dependent imbalance and ultimately suppress the image of the 5 G NR signal to the noise level. Accordingly, the method according to the disclosure may be a robot self-calibration technique for ultra-wideband 5 G transceivers for millimeter wave communication.

The method according to the disclosure may be more innovative than most of the existing techniques in the sense that the derivation can be extended to other types of feedback or hardware structure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of operating an electronic device in a wireless communication system, the method comprising:
    inputting training signals into a first loopback route and a second loopback route;
    determining a loopback gain and a loopback phase, based on a first training signal passing through the first loopback route and a second training signal passing through the second loopback route;
    determining a compensation filter in a frequency domain, based on the loopback gain and the loopback phase;
    determining a finite impulse response (FIR) filter, based on the compensation filter;
    determining a direct current (DC) offset, based on the FIR filter; and
    compensating for a transmission signal and a reception signal, based on the FIR filter and the DC offset,
    wherein the training signals are determined based on a phase of a first training signal and a phase of a second training signal.

2. The method of claim 1,
    wherein the loopback phase includes a phase of the first loopback route and a phase of the second loopback route,
    wherein the training signals are determined based on a difference between the phase of the first loopback route and the phase of the second loopback route.

3. The method of claim 2, wherein the difference between the phase of the first loopback route and the phase of the second loopback route is 90 degrees.

4. The method of claim 1, wherein the training signals are determined based on a difference between a phase of the first training signal and a phase of the second training signal.

5. The method of claim 4, wherein the difference between the phase of the first training signal and the phase of the second training signal is 180 degrees.

6. The method of claim 5,
    wherein the training signals are determined based on a determination function, and
    wherein the determination function is determined based on the difference between a phase of the first loopback route and a phase of the second loopback route and the difference between the phase of the first training signal and the phase of the second training signal.

7. The method of claim 6, wherein a value of the determination function is not 0.

8. The method of claim 6, wherein the training signals are determined based on a maximum value of the determination function.

9. The method of claim 1, wherein an image component of the transmission signal is removed based on the FIR filter and the DC offset.

10. The method of claim 1, wherein an image component of the reception signal is removed based on the FIR filter and the DC offset.

11. An electronic device comprising:
    a controller; and
    a radio frequency (RF) transceiver,
    wherein the RF transceiver comprises a transmitting side, a receiving side, and a first loopback route and a second loopback route electrically connected to the transmitting side and the receiving side,
    wherein the controller is configured to:
        input training signals into the first loopback route and the second loopback route,
        determine a loopback gain and a loopback phase, based on a first training signal passing through the first loopback route and a second training signal passing through the second loopback route,
        determine a compensation filter in a frequency domain, based on the loopback gain and the loopback phase,
        determine a finite impulse response (FIR) filter, based on the compensation filter,
        determine a direct current (DC) offset, based on the FIR filter, and
        compensate for a transmission signal and a reception signal, based on the FIR filter and the DC offset, and
    wherein the training signals are determined based on a phase of a first training signal and a phase of a second training signal.

12. The electronic device of claim 11,
    wherein the loopback phase includes a phase of the first loopback route and a phase of the second loopback route, wherein the training signals are determined based on a difference between the phase of the first loopback route and the phase of the second loopback route.

13. The electronic device of claim 12, wherein the difference between the phase of the first loopback route and the phase of the second loopback route is 90 degrees.

14. The electronic device of claim 11, wherein the training signals are determined based on a difference between a phase of the first training signal and a phase of the second training signal.

15. The electronic device of claim 14, wherein the difference between the phase of the first training signal and the phase of the second training signal is 180 degrees.

16. The electronic device of claim 15,
wherein the training signals are determined based on a determination function, and
wherein the determination function is determined based on the difference between a phase of the first loopback route and a phase of the second loopback route and the difference between the phase of the first training signal and the phase of the second training signal.

17. The electronic device of claim 16, wherein a value of the determination function is not 0.

18. The electronic device of claim 16, wherein the training signals are determined based on a maximum value of the determination function.

19. The electronic device of claim 11, wherein an image component of the transmission signal is removed based on the FIR filter and the DC offset.

20. The electronic device of claim 11, wherein an image component of the reception signal is removed based on the FIR filter and the DC offset.

* * * * *